United States Patent
Du

(10) Patent No.: US 6,172,437 B1
(45) Date of Patent: Jan. 9, 2001

(54) HYBRID AC/DC MOTOR

(75) Inventor: Hung T. Du, Reisterstown, MD (US)

(73) Assignee: Black & Decker Inc., Newark, DE (US)

(*) Notice: Under 35 U.S.C. 154(b), the term of this patent shall be extended for 0 days.

(21) Appl. No.: 09/287,812

(22) Filed: Apr. 7, 1999

(51) Int. Cl.$^7$ .................................................. H02K 13/00
(52) U.S. Cl. .......................... 310/136; 310/198; 318/245
(58) Field of Search .................... 310/136, 127, 310/50, 47, 154, 131, 198; 187/290; 318/245, 441

(56) References Cited

U.S. PATENT DOCUMENTS

| | | | |
|---|---|---|---|
| 2,339,228 | 1/1944 | Weydell | 310/127 |
| 3,079,510 | * 2/1963 | Hartwig | 307/65 |
| 3,160,772 | 12/1964 | Miron | 310/146 |
| 3,652,879 | * 3/1972 | Plunkett et al. | 310/50 |
| 3,791,684 | * 2/1974 | Hamman | 290/38 R |
| 4,080,540 | * 3/1978 | Karube | 310/49 R |
| 4,424,464 | 1/1984 | Ikegami | 310/68 D |
| 4,462,467 | * 7/1984 | Weingarner | 173/105 |
| 4,507,720 | * 3/1985 | Colbrese | 363/13 |
| 4,835,410 | * 5/1989 | Bhagwat | 307/64 |
| 4,910,790 | 3/1990 | Kershaw | 388/836 |
| 4,990,844 | 2/1991 | Gritter et al. | 318/762 |
| 5,294,874 | 3/1994 | Hessenberger et al. | 318/759 |
| 5,648,706 | 7/1997 | Polk et al. | 318/376 |
| 5,821,476 | * 10/1998 | Hakala et al. | 187/290 |

FOREIGN PATENT DOCUMENTS

83/01156 * 3/1983 (WO).

* cited by examiner

*Primary Examiner*—Nestor Ramirez
*Assistant Examiner*—Joseph Waks
(74) *Attorney, Agent, or Firm*—Harness, Dickey & Pierce, P.L.C.

(57) ABSTRACT

A motor for a power tool adapted to be powered by either an AC power source or a DC power source. The motor 12 includes a permanent magnet field 30 having an armature 34 disposed within the field. The armature 34 includes a shaft 36 having a DC commutator 38 disposed at one end of the shaft. The DC commutator is coupled to a first armature winding. An AC commutator 42 is disposed coaxially over a portion of the DC commutator 38 and is coupled to a second armature winding 44. A first pair of brushes 46 are disposed on the DC commutator 38 for coupling power from a DC power source to the first armature winding 40. A second pair of brushes 48 couple rectified AC power to the second armature winding 44. A power module including an AC/DC selector switch 26 enables a user to select whether AC or DC power is to be used to power the tool.

9 Claims, 5 Drawing Sheets

HYBRID AC/DC MOTOR

BACKGROUND OF THE INVENTION

1. Technical Field

This invention relates to electric motors, and more particularly to a power tool having an electric motor adapted to be powered by either an AC power source or a DC battery.

2. Discussion

Electric motors are used in a wide variety of applications. In the power tool industry, electric motors are used to power various tools such as drills, grinders, circular saws and other various portable, electrically powered tools. In recent years, battery powered electric hand tools have become increasingly popular. The provision of the battery has greatly enhanced the utility of such hand tools, allowing their use in applications where an AC power source is unavailable.

In spite of the advantages of having a battery powered electric hand tool, it would nevertheless still be desirable to be able to use AC power in the event the battery of the power tool becomes discharged to a point where the tool can no longer be used, but an AC power source is readily available. In such situations, simply connecting the electric power tool to the AC power source via an electric extension cord would enable the power tool to be used to finish the task at hand.

Accordingly, it is a principal object of the present invention to provide a power tool capable of being powered by either an AC or a DC power source without requiring modification to the tool.

It is a further object of the present invention to provide a power tool having a motor which is capable of being powered by an AC or a DC power source, and where the motor does not require the overall dimensions of the power tool to be increased significantly, does not increase the overall weight of the power tool significantly, and further does not significantly increase the cost of manufacturing the power tool.

SUMMARY OF THE INVENTION

The present invention relates to a power tool incorporating a motor which may be powered from an AC or a DC power source. The power tool incorporates a power module circuit having a switch by which the power tool can be set to be used with either AC or DC power. The motor includes a permanent magnet field within which an armature is disposed. The armature is supported for rotation on an armature shaft. At one end of the armature shaft a first (i.e., "DC") commutator is disposed thereon. A first field winding is electrically coupled to the DC commutator to transmit DC power to the first armature winding. A second armature winding is electrically coupled to a second (i.e., "AC") commutator disposed on the armature shaft. In a preferred embodiment the AC commutator is disposed over a portion of the DC commutator. A first pair of brushes is operably associated with the DC commutator for transmitting DC power to the first armature winding. A second pair of brushes is operably associated with the AC commutator for transmitting rectified AC power to the second armature winding.

In use, the second armature winding associated with the AC commutator enables the motor to be powered by a rectified AC signal. To run the motor in a DC mode, a switch associated with the motor is engaged to isolate the motor from the AC power source and to couple a battery pack of the tool to the DC commutator. In this manner, the first armature winding associated with the DC commutator may be energized by the DC signal from the battery pack.

In the preferred embodiment the power module circuit also incorporates a braking circuit. The braking circuit incorporates a normally closed switch placed across one of the AC or DC windings for braking the motor in both the AC and DC operating modes. The braking characteristics desired (i.e., hard braking or soft braking) determine which winding the switch is placed across.

The motor of the power tool of the present invention has a relatively small size and low weight, and still provides high efficiency. The motor and its related circuitry is ideal for hand held power tools where size and weight are major considerations in the design and operation of the tool.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
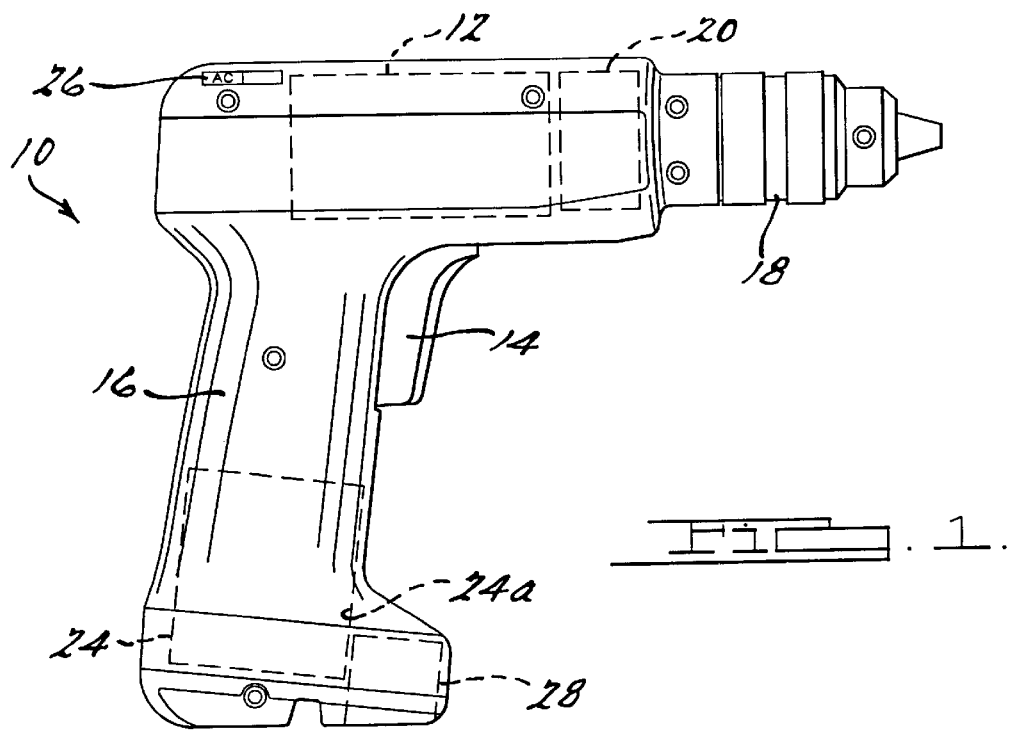
FIG. 1 is a elevational view of an exemplary power tool with which the motor of the present invention may be used.

Referring to FIG. 1, there is shown an exemplary, hand-held electric power tool 10 incorporating a motor 12 in accordance with the present invention. It will be appreciated immediately that the motor 12 and its related circuitry may be used in a wide variety of electrically-driven power tools. Therefore, the illustration of a hand-held, electrically driven drill in FIG. 1 will be understood as being for exemplary purposes only and not limiting the motor 12 and its related circuitry to any particular form of tool. It is anticipated that the motor 12 will find utility with electrically driven, hand-held grinders, circular saws, jigsaws, and virtually any other electrically-driven power tool in which the capability of operating off of an AC or DC power source would even further enhance the utility of the tool.

With further reference to FIG. 1, the power tool 10 typically incorporates a user actuable trigger 14, a handle portion 16 and a chuck 18. The chuck is attached to a gear reduction assembly 20 which is in turn coupled to an output end of an armature shaft associated with the motor 12. A battery pack 24 is carried by the power tool 10 to supply DC power to the motor 12 for operation. A manually engageable AC/DC selector switch 26 allows a user to set the tool 10 for use with either AC or DC power. When the switch 26 is moved into its "AC" position, the motor 12 is able to receive AC power through a receptacle 28 to which an electrical extension cord may be releasably attached. When the battery pack 24 has a sufficient charge, the power tool 10 may be operated strictly off of the DC power available from the battery pack 24 when the switch 26 is in its "DC" position. In the preferred embodiment, the battery 24 pack comprises a removable, rechargeable 12 volt DC battery pack.

It will be appreciated that the selector switch 26 and the AC receptacle 28 may be located on the drill 10 at other locations. An option would be to have the switch 26 disposed within the recess 24*a* such that it is automatically engaged when the battery pack 24 is inserted, thereby automatically setting the tool 10 for operation from a DC power source. Removal of the DC battery back 24, and disengagement of the switch 26, would automatically set the tool 10 to operate off of AC power.

Figure 2:
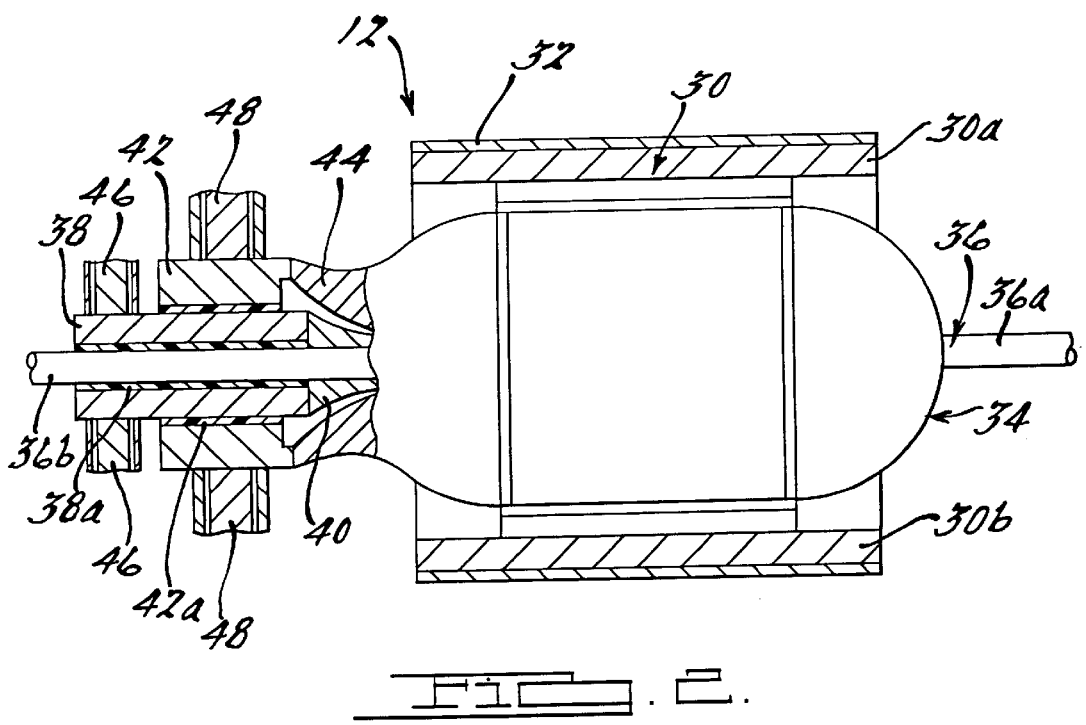
FIG. 2 is a simplified cross sectional view of the motor of the present invention.

Referring to FIG. 2, the motor 12 is shown in greater detail. The motor incorporates a permanent magnet field 30. The permanent magnet field 30 is preferably provided in two sections 30*a* and 30*b* which each comprise a permanent ceramic magnet. Each permanent magnet 30*a* and 30*b* is adhered to a motor can 32, which is preferably a cold rolled steel motor can. Within the permanent magnet field 30 is an armature 34 which is supported on an armature shaft 36 extending coaxially through the armature. The armature shaft 36 includes a first end 36*a* and a second end 36*b*. Disposed concentrically on the second end 36*b* is a DC commutator 38 which is fixedly secured to the second end 36*b* so as to rotate with the shaft 36. A phenolic insulating portion 38*a* insulates the commutator 38 from the armature shaft 36. Electrically coupled to the DC commutator 38 is a first (i.e., "DC") armature winding 40 which is wound in a conventional "on the fly" alpha winding pattern over a portion of the armature 34. The first armature winding 40 is preferably wound with heavy gauge wire, such as possibly 20 AWG wire.

Disposed fixedly to and coaxially over a portion of the DC commutator 38 is an AC commutator 42. The AC commutator 42 is electrically insulated from the DC commutator 38 via a phenolic insulating portion 42*a* and is electrically coupled to a second (i.e., "AC") armature winding 44. The second armature winding 44 is also wound over a portion of the first winding 40 in a conventional "on the fly" alpha winding pattern. It is strongly preferred that the second armature winding 44 be wound on top of the first armature winding 40 due to the fact that the second winding 44 is of thinner gauge wire, for example 28 AWG wire, and would be susceptible to breakage if it is was wound first on the armature 34.

With further reference to FIG. 2, a first pair of brushes 46 is associated with the DC commutator 38 and used to couple DC power from the battery 24 (FIG. 1) to the first armature winding 40 when the battery 24 is being used as the power source for the motor 12. A second pair of brushes 48 is coaxially disposed over the AC commutator 42 and used to transmit rectified AC power to the second armature winding 44 when an AC power source is being used to power the motor 12.

It will be appreciated that while both commutators 38 and 42 are disposed on the second end 36*b* of the armature shaft 36, that one of the commutators 38 or 42 could just as easily be disposed on the first end 36*a* of the armature shaft 36. Disposing both commutators 38 and 42 coaxially on one side of the armature 34, however, makes for a more compact motor assembly which is more desirable in hand held power tools where overall compactness of the tool is a desirable feature. Incorporating both commutators 38 and 42 on the same end of the armature shaft 36 also reduces the wiring complexity and the overall number of parts required for the motor 12.

Figure 3:
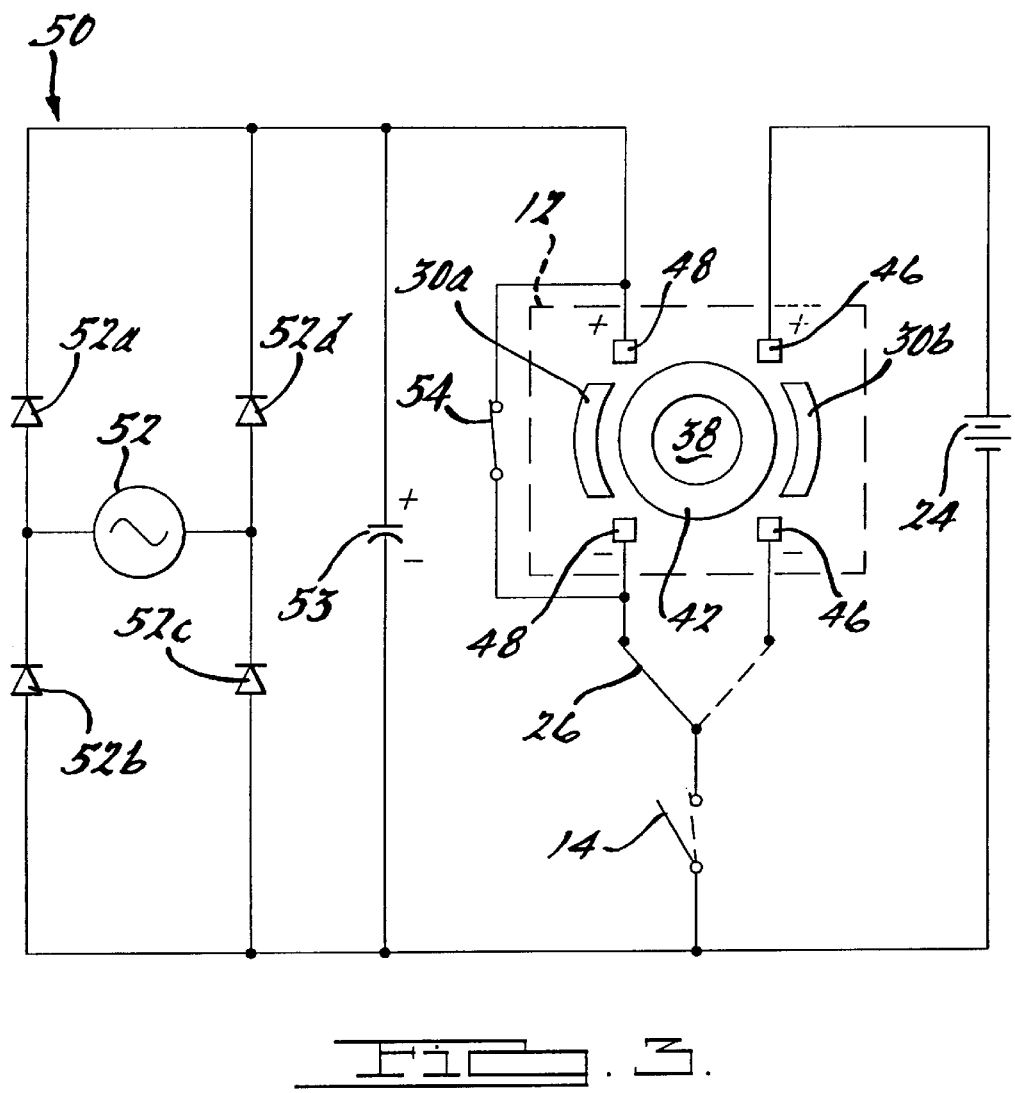
FIG. 3 is a simplified schematic drawing of the motor of FIG. 2 and its related circuitry.
Figure 4:
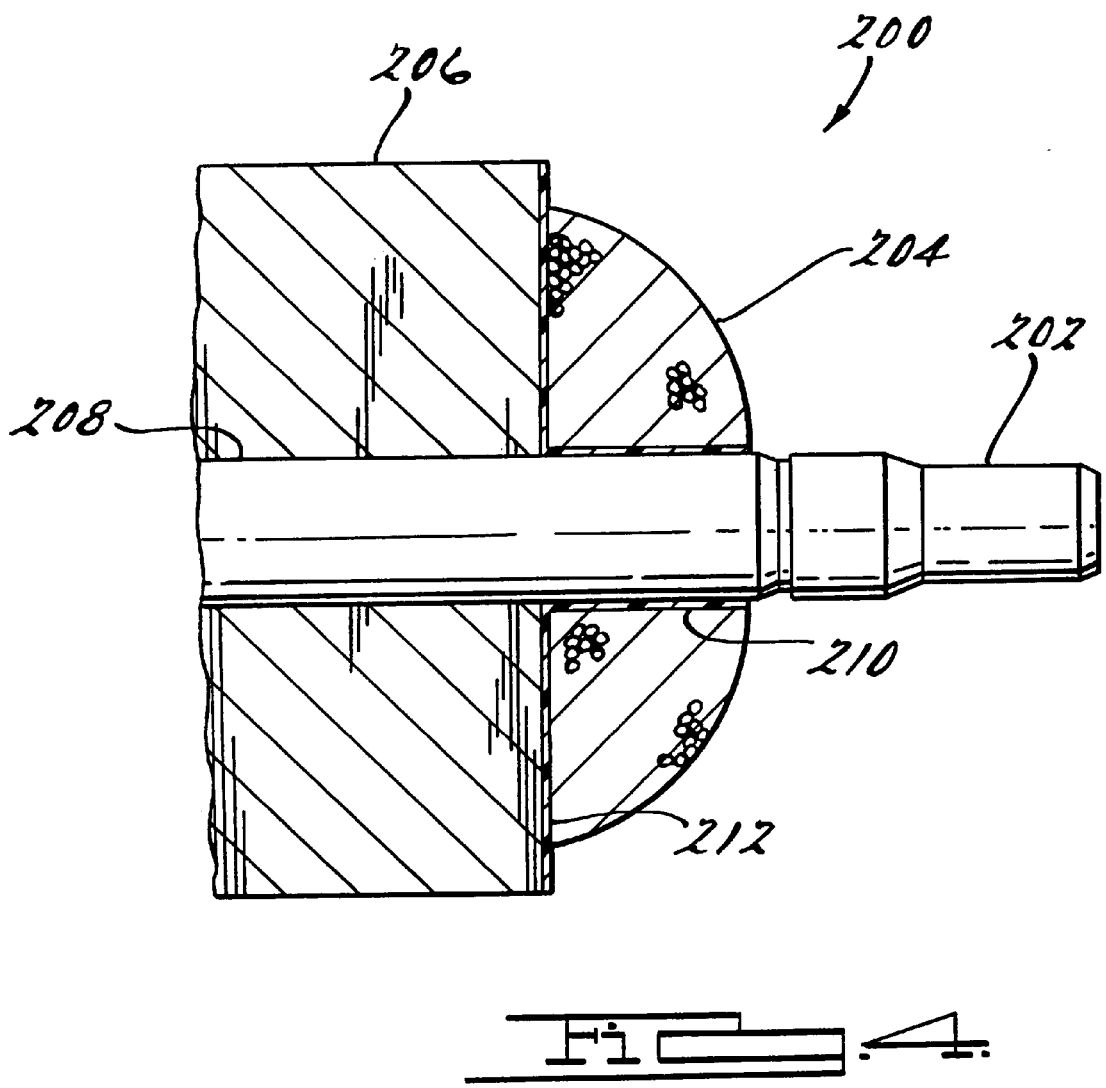
FIG. 4 is a cross-sectional view of an armature of a non-double insulated DC power tool motor.

Referring now to FIG. 3, a power module 50 forming a motor control circuit incorporating the motor 12 of the present invention is illustrated. A 120 volt AC power source 52 is coupled across a full wave bridge rectifier circuit 52 comprised of diodes 52*a*–52*d* to provide a ripple DC signal. A filtering capacitor 53 provides a filtered DC signal to the brushes 48.

The AC/DC selector switch comprises a rated single pole, double throw switch. When the AC/DC switch 26 is in the "AC" position shown in FIG. 3, and the trigger 14 is in the position shown in phantom in FIG. 3, then the AC power source can be used to power the motor 12. In this mode current is supplied through the brushes 48 to the second armature winding 44. When the switch 26 is moved into the position shown in phantom in FIG. 3 while the trigger 14 is held in the position shown in phantom, then the motor 12 may be powered from the battery pack 24. In this "DC" operating mode DC power is applied to the brushes 46. The brushes 46 transmit DC current through the DC commutator 38 to the first armature winding 40, thus enabling the motor 12 to be powered by the battery pack 24. A brake switch 54 is coupled across the AC brushes 48 to provide braking to the motor 12. It will be appreciated, however, that braking occurs in both the AC and DC operating modes.

The second (i.e., AC) armature winding 44 has a higher electrical resistance than the first armature winding, which enables a "softer" braking action to be effected. If a "harder" (i.e., more abrupt) braking action is desired, the brake switch 54 may be coupled across the DC brushes 46. Thus, the braking action can be tailored for specific types of power tools. Brake switch 54 is a "normally closed" switch which closes automatically as soon as trigger switch 14 is released by a user into a "normally open" position.

Returning to FIG. 1, although the motor 12 of the present invention is designed to be powered by a relatively low voltage DC power source (i.e., a DC source less than 50 volts), the housing of the power tool 10 in the preferred embodiment is nonetheless double insulated from the electrical system of the tool. As is well known to those skilled in the art, power tools designed to be operated by a high voltage power source, such as a conventional AC or corded power tool, are typically constructed so that the housing of the tool is "double insulated" from the electrical system of the tool for safety reasons. In this manner, the operator of the tool is protected against electrical shock in the event of a short in the electrical system of the tool. Cordless or DC powered tools are powered by low voltage power sources and therefore do not require such safety measures. Consequently, conventional DC powered tools do not insulate the housing from the electrical system of the tool.

There are, of course, many DC powered portable devices that are alternatively powered from high voltage AC house current. To enable this alternative operation, however, AC/DC powered devices universally employ transformers to step down the high AC voltage and thereby isolate the device from the high voltage AC power source.

While this solution may be acceptable for relatively low powered devices, such as portable stereos, the power requirements of many portable power tools necessitates the use of large step-down transformers which are not only bulky, but also very heavy. Consequently, DC powered tools that can alternatively be powered from AC house current have rarely been offered commercially.

The power tool 10 of the present invention may be double insulated in a variety of ways. One such way is through the use of a plastic gear on the input side of the gear reduction box 20 where the output of the box 20 is coupled to the chuck 18. This arrangement will serve to electrically isolate the electrically conductive portions of the tool 10 from the AC power source in the event of a short in the motor 12.

While the above-described arrangement is suitable for electrical motors having a relatively low torque output, in many applications, such as with an electrically driven power saw, the motor torque required of the motor 12 will be too great to transfer through plastic gear and/or shaft components. In these instances, other arrangements for double insulating the tool will need to be employed.

FIGS. 4–9 depict the effect of employing double insulation within a motor and housing. Double insulation techniques are well known in the art. Double insulated tools are typically constructed of two separate layers of electrical insulation or one double thickness of insulation between the operator and the tool's electrical system. With specific reference to FIG. 4, a cross-sectional view of a standard, non-double insulated DC motor armature 200 is illustrated. The armature 200 consists of a shaft 202 with a core built up over it. The core is composed of many laminations 206 with notches along the outer periphery to hold the armature windings 204. A gear and/or chuck (not shown) is built onto the shaft at one end of the armature 206 to provide a means of transferring rotational energy to the working end of the power tool. For example a gear mechanism would convert rotational energy to the forward and back motion used to drive a reciprocating saw. The path from the armature shaft 202 to the gear mechanism or chuck, and finally to the working end is electrically conductive. Therefore any electrical energy that exists on the armature shaft 202 is conducted to the working end, which is exposed to the operator of the power tool 12. Locations 208, 210, and 212 indicate areas of the rotor that could become energized through contact with electrically live assemblies if insulation is not employed. At location 208 the armature shaft 202 could be energized through contact with energized armature laminations 206. At location 210 the armature shaft 202 could be energized through contact with end turns of the armature windings 204. At location 212 the armature laminations 206 could be energized through contact to end turns of the armature windings 204.

Figure 5:
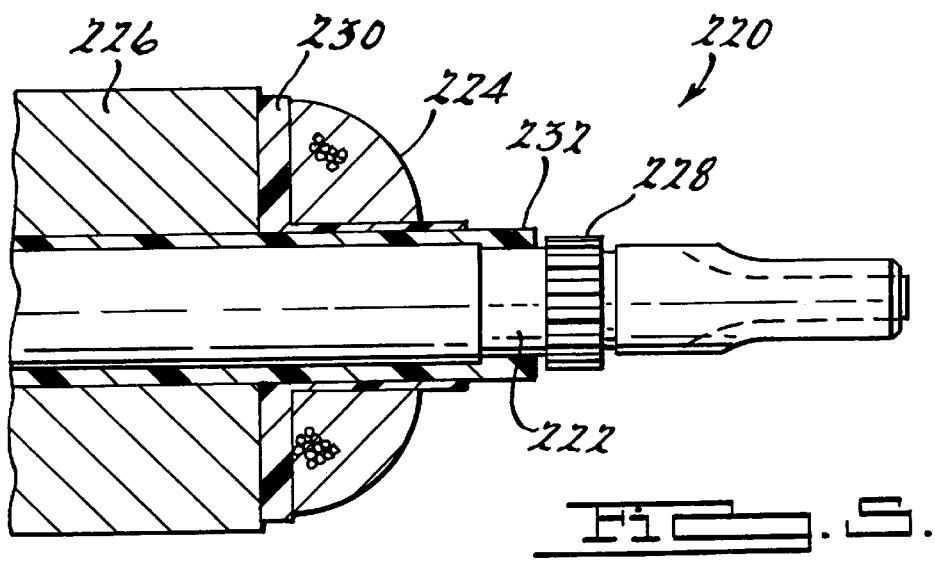
FIG. 5 is a cross-sectional view of an armature of a DC power tool motor that employs a first method of double insulation.

Referring to FIG. 5, a first method of employing double insulation of the motor armature 200 of a power tool is illustrated. The armature 220 consists of a shaft 222 with a core built up over it. The core is composed of many laminations 226 with notches along the outer periphery to hold the armature windings 224. A chuck 228 is built onto the shaft at one end of the armature laminations 206 to provide a means of affixing a device such as a drill bit to the working end 208 (see FIG. 4) of the power tool. A molded plastic insulator 230 provides basic insulation between the armature windings 224 and the laminations 226 as well as between the shaft 222 and the windings 224. A press fit plastic tube insulator 232 encases the shaft 222 providing supplementary insulation to prevent the shaft from becoming energized if the basic insulation breaks down.

Figure 6:
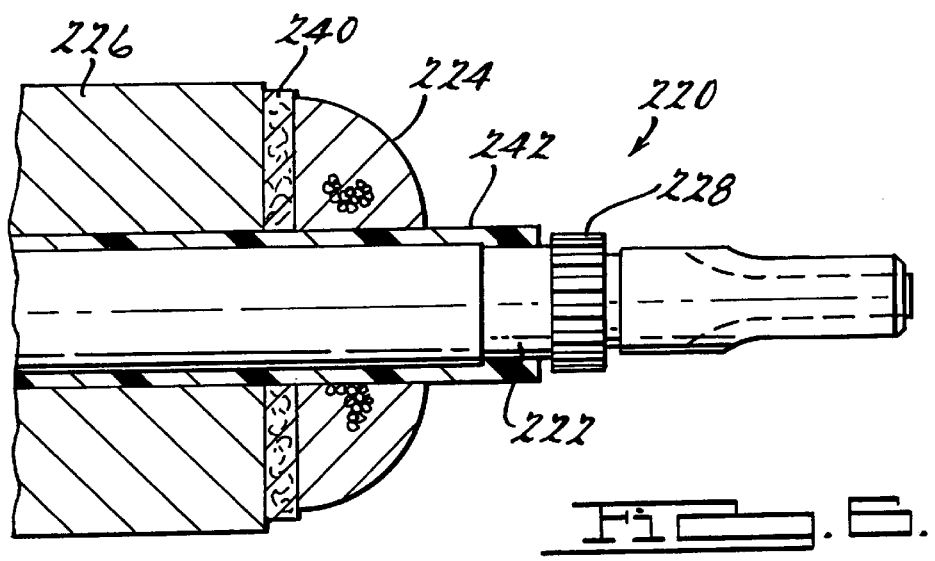
FIG. 6 is a cross-sectional view of an armature of a DC power tool motor that employs a second method of double insulation.

Referring to FIG. 6, a second method of employing double insulation of the motor armature 220 of a power tool is illustrated. A paper insulator 240 provides basic insulation between the armature windings 224 and the laminations 226. A second insulator 242 of double thickness, 2 mm, encases the shaft 222 providing reinforced insulation, which substitutes for supplementary insulation, to prevent the shaft from being energized through electrical shorts to the laminations 226 or the armature windings 224.

Figure 7:
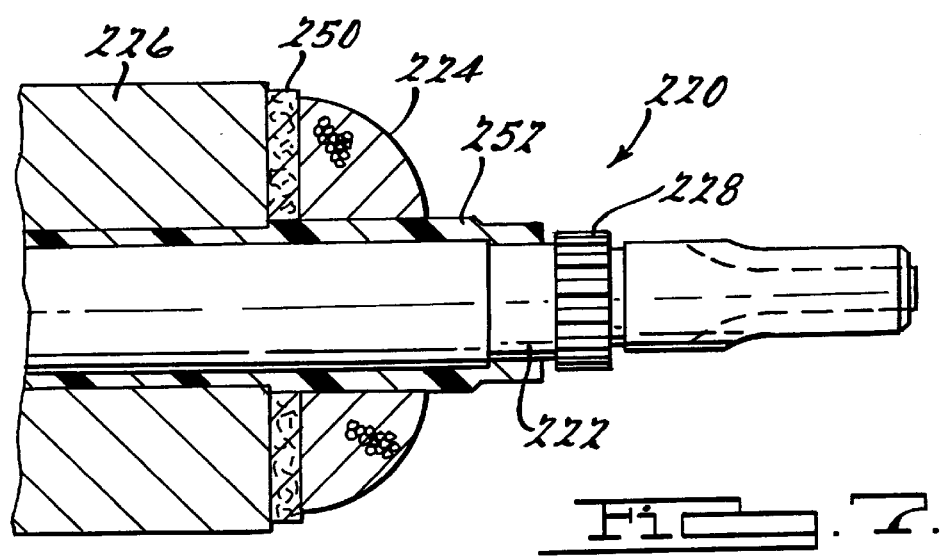
FIG. 7 is a cross-sectional view of an armature of a DC power tool motor that employs a third method of double insulation.

Referring to FIG. 7, a third method of employing double insulation of the motor armature 220 of a power tool is illustrated. An insulator 250 of either paper or molded plastic provides basic insulation between the armature windings 224 and the laminations 226. An in situ molded thermostat plastic insulator 252 of double thickness encases the shaft 222 providing reinforced insulation, which substitutes for supplementary insulation, to prevent the shaft from being energized through electrical shorts to the laminations 226 or the armature windings 224.

Figure 8:
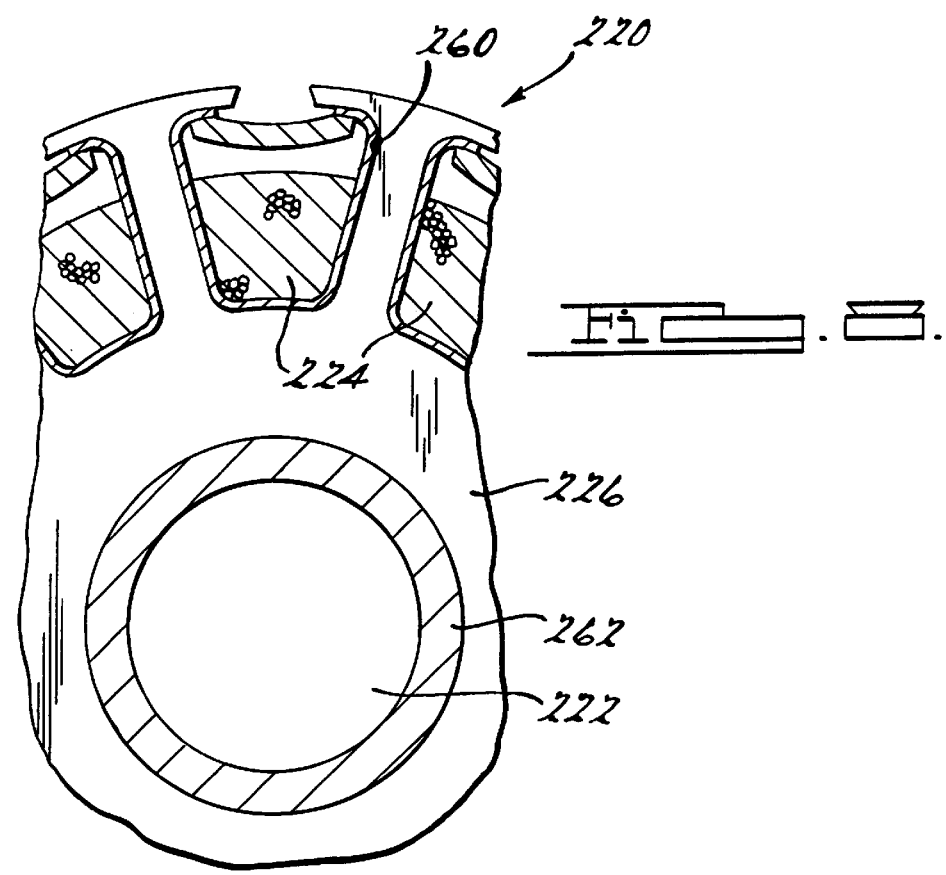
FIG. 8 is a cross section through the center of the lamination stack of an armature for a DC power tool motor that employs double insulation.

Referring to FIG. 8, a cross-section through the center of the lamination stack of the motor armature 220 of a power tool is illustrated. A slot liner insulator 260 provides basic insulation between the armature windings 224 and the laminations 226. The slot liner insulator is constructed of any suitable electrical insulator material such as paper, coated paper, polyester, and vulcanized fiber. Supplementary insulation is provided by a glass reinforced polyester insulator sleeve 262 which encase the shaft 222. The insulator sleeve prevents the shaft from becoming energized if the basic insulation provided by slot liner 260 fails.

Figure 9:
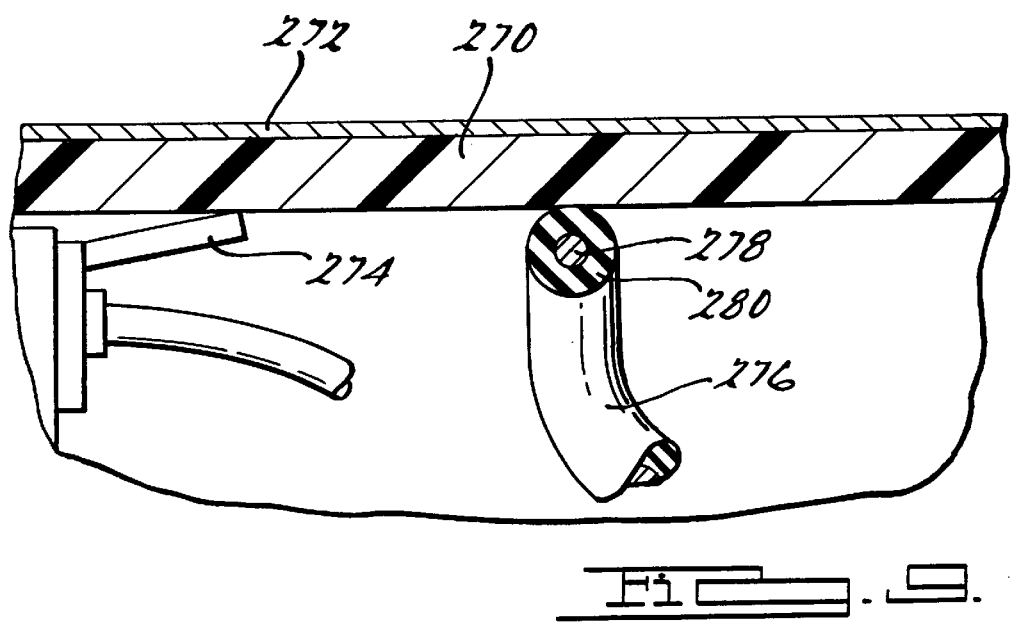
FIG. 9 is a cross-sectional view of a housing for a DC power tool that employs double insulation.

Referring to FIG. 9, a double insulated housing 270 of a power tool is illustrated. As is known in the art, the employed double insulation methods employed are intended to electrical energy within the housing 270 from energizing the outside surface of the housing 270. The housing 270 is depicted with a hypothetical metal foil covering 272 on the outside surface to simulate interaction with an operator. Also illustrated are a ring terminal 274 and an insulated wire 276 that includes a conductive wire 278 and wire insulation 280. Electrical energy exists on both the ring terminal 274 and the conductive wire 278. Double insulation of the ring terminal 274 is provided by a double thickness, 2 mm, of housing material which serves as a reinforced insulator. The wire insulation 280 provides basic insulation for conductive wire 278. Supplementary insulation is provided by the housing 270 which prevents electrical energy that breaks through the wire insulation from energizing the outside surface of the housing 270.

The motor 12 of the present invention therefore represents a lightweight, compact means for powering a tool from either an AC or a DC power source. As such, the motor 12 can be powered by a rechargeable DC battery pack or from a standard AC power source if a charged battery pack is not available or if the battery pack becomes discharged before the task at hand is completed. The motor 12 operates from either an AC or a DC power source with only a few additional component parts and without adding significantly to the overall weight, dimensions or cost of a power tool.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A hybrid AC/DC motor which can be operated from an alternating current power source or a direct current power source, said motor comprising:

a permanent magnet field;

an armature disposed within said permanent magnet field;

a shaft extending concentrically through said armature and supporting said armature for rotation within said permanent magnet field;

a DC commutator affixed to an end of said shaft;

a first armature winding wound onto said armature and electrically coupled to said DC commutator;

an AC commutator affixed to said shaft;

a second armature winding wound onto said armature and electrically coupled to said AC commutator;

a pair of DC brushes in contact with said DC commutator for coupling a DC current to said DC commutator when a power source being used comprises said direct current power source;

a pair of AC brushes in contact with an AC commutator for coupling AC current to said AC commutator when a power source being used comprises said alternating current power source; and a user engageable switch operably associated with said pair of AC brushes and said pair of DC brushes for coupling only one of said pair of AC brushes or said DC brushes to an associated one of said AC and DC power sources at a time.

2. The motor of claim 1, wherein said AC commutator is disposed coaxially over a portion of said DC commutator.

3. The motor of claim 1, wherein said AC commutator and said DC commutator are both disposed at a common end of said armature shaft.

4. The motor of claim 1, wherein said AC armature winding is disposed over said DC armature winding.

5. A hybrid AC/DC motor which can be operated from an alternating current power source or a direct current power source, said motor comprising:

a permanent magnet field;

an armature disposed within said permanent magnet field;

a shaft extending concentrically through said armature and supporting said armature for rotation within said permanent magnet field;

a DC commutator affixed to an end of said shaft;

a first armature winding wound onto said armature and electrically coupled to said DC commutator;

an AC commutator affixed to said end of said shaft concentrically over a portion of said DC commutator;

a second armature winding wound onto said armature and electrically coupled to said AC commutator;

a pair of DC brushes in contact with said DC commutator and electrically coupled to said direct current power source for coupling a DC current to said DC commutator when said direct current power source comprises a DC battery;

a pair of AC brushes in contact with said AC commutator and electrically coupled to said direct current power source for coupling said alternating current to said AC commutator when a power source comprises said alternating current power source; and a switch for electrically coupling, only one at a time, either said alternating power source or said direct current power source to said AC brushes or said DC brushes, respectively.

6. The motor of claim 5, wherein said second armature winding is wound over said first armature winding.

7. The motor of claim 5, wherein said permanent magnet field comprises a pair of ceramic magnet segments secured to a motor can.

8. A power module for enabling AC or DC power to be used to power an electrically driven implement, the power module comprising:

a rectifier circuit for receiving an AC input signal and generating a DC signal therefrom;

a capacitor for filtering said DC signal;

a battery;

a motor including an armature having a shaft, said armature including an AC commutator disposed on an end of said shaft and electrically coupled to an associated AC field winding disposed on said armature, and a DC field winding disposed on said shaft and electrically coupled to a DC commutator;

said DC commutator and said AC commutator further being disposed on a common end of said shaft;

a pair of AC brushes associated with said AC commutator;

a pair of DC brushes associated with said DC commutator; and a switch for coupling only one of said battery or said AC power source to said motor at any given time.

9. The power module of claim 8, further comprising:

a brake switch coupled across one of said pairs of AC or DC brushes for braking said motor when an on/off power switch of said electrically driven implement is engaged in an off position.

* * * * *